(12) United States Patent
Wong et al.

(10) Patent No.: US 7,720,796 B2
(45) Date of Patent: May 18, 2010

(54) DIRECTORY AND FILE MIRRORING FOR MIGRATION, SNAPSHOT, AND REPLICATION

(75) Inventors: Chi M. Wong, San Francisco, CA (US); Thomas K. Wong, Pleasanton, CA (US); Panagiotis Tsirigotis, Sunnyvale, CA (US); Richard A. Simpkins, Mountain View, CA (US); Zuwei Liu, Cupertino, CA (US)

(73) Assignee: Neopath Networks, Inc., Mountain View, CA (US)

( * ) Notice: Subject to any disclaimer, the term of this patent is extended or adjusted under 35 U.S.C. 154(b) by 224 days.

(21) Appl. No.: 11/324,845

(22) Filed: Jan. 3, 2006

(65) Prior Publication Data

US 2006/0161746 A1 Jul. 20, 2006

Related U.S. Application Data

(63) Continuation-in-part of application No. 10/831,701, filed on Apr. 23, 2004, now Pat. No. 7,587,422, which is a continuation-in-part of application No. 10/831,376, filed on Apr. 23, 2004, now Pat. No. 7,346,664.

(60) Provisional application No. 60/641,217, filed on Dec. 31, 2004.

(51) Int. Cl.
*G06F 17/00* (2006.01)

(52) U.S. Cl. ............ 707/104.1; 707/101; 707/102; 707/103 R

(58) Field of Classification Search ............ 707/1–10, 707/100–104.1, 200–206, 600–831
See application file for complete search history.

(56) References Cited

U.S. PATENT DOCUMENTS 5,689,701 A 11/1997 Ault et al.
5,774,715 A 6/1998 Madany et al.

(Continued)

FOREIGN PATENT DOCUMENTS

EP 0 926 585 6/1999

(Continued)

OTHER PUBLICATIONS

Anderson, D.C. et al., "Interposed Request Routing For Scalable Network Storage," ACM Transactions on Computer Systems, Feb. 2002, vol. 20, No. 1, pp. 1-24.

(Continued)

*Primary Examiner*—Isaac M Woo
(74) *Attorney, Agent, or Firm*—Weaver Austin Villeneuve & Sampson LLP

(57) ABSTRACT

A NAS switch provides mirroring in a NAS storage network that is transparent to client. A source file server exports an original NAS file handles indicative of object locations on the source file server to the NAS switch. The NAS switch modifies the original NAS file handles to an internal file system and maps the original NAS file handles to a switch file handles independent of location. The NAS switch exports the switch file handles to a client. The client looks-up objects and makes NAS requests to the source file server using switch file handles. The NAS switch performs mirroring of a namespace when during processes such as data migration, data replication, and data snapshot.

16 Claims, 10 Drawing Sheets

U.S. PATENT DOCUMENTS

| | | | |
|---|---|---|---|
| 5,890,169 | A | 3/1999 | Wong et al. |
| 5,933,825 | A | 8/1999 | McClaughry et al. |
| 6,101,508 | A | 8/2000 | Wolff |
| 6,192,408 | B1 | 2/2001 | Vahalia et al. |
| 6,314,460 | B1 | 11/2001 | Knight et al. |
| 6,353,837 | B1 | 3/2002 | Blumenau |
| 6,389,427 | B1 | 5/2002 | Faulkner |
| 6,408,298 | B1 * | 6/2002 | Van et al. ............... 707/10 |
| 6,442,548 | B1 | 8/2002 | Balabine et al. |
| 6,453,354 | B1 | 9/2002 | Jiang et al. |
| 6,473,401 | B1 | 10/2002 | Kong et al. |
| 6,606,690 | B2 | 8/2003 | Padovano |
| 6,615,365 | B1 | 9/2003 | Jenevein et al. |
| 6,633,887 | B2 | 10/2003 | Suzuki et al. |
| 6,697,846 | B1 | 2/2004 | Soltis |
| 6,711,625 | B1 | 3/2004 | Simpson |
| 6,738,883 | B2 | 5/2004 | March et al. |
| 6,931,410 | B2 | 8/2005 | Anderson et al. |
| 6,938,039 | B1 | 8/2005 | Bober et al. |
| 6,983,379 | B1 | 1/2006 | Spalink et al. |
| 6,985,956 | B2 | 1/2006 | Luke et al. |
| 6,996,714 | B1 | 2/2006 | Halasz et al. |
| 7,054,927 | B2 | 5/2006 | Ulrich et al. |
| 7,072,917 | B2 | 7/2006 | Wong et al. |
| 7,089,293 | B2 | 8/2006 | Grosner et al. |
| 7,096,253 | B2 | 8/2006 | Vinson et al. |
| 7,120,666 | B2 | 10/2006 | McCanne et al. |
| 7,127,477 | B2 | 10/2006 | Duncombe et al. |
| 7,272,613 | B2 | 9/2007 | Sim et al. |
| 7,272,654 | B1 | 9/2007 | Brendel |
| 7,308,709 | B1 | 12/2007 | Brezak, Jr. et al. |
| 7,313,579 | B2 | 12/2007 | Murotani |
| 7,346,664 | B2 | 3/2008 | Wong et al. |
| 7,441,011 | B2 * | 10/2008 | Lin et al. ............... 709/203 |
| 7,475,142 | B2 | 1/2009 | Sharma et al. |
| 2002/0013832 | A1 | 1/2002 | Hubbard |
| 2002/0111929 | A1 | 8/2002 | Pudipeddi et al. |
| 2002/0120763 | A1 | 8/2002 | Miloushev et al. |
| 2002/0133491 | A1 | 9/2002 | Sim et al. |
| 2002/0161855 | A1 | 10/2002 | Manczak et al. |
| 2002/0199060 | A1 | 12/2002 | Peters et al. |
| 2003/0037061 | A1 | 2/2003 | Sastri et al. |
| 2003/0046270 | A1 | 3/2003 | Leung et al. |
| 2003/0046335 | A1 | 3/2003 | Doyle et al. |
| 2003/0056112 | A1 | 3/2003 | Vinson et al. |
| 2003/0110263 | A1 | 6/2003 | Shillo |
| 2003/0126247 | A1 | 7/2003 | Strasser et al. |
| 2003/0140051 | A1 | 7/2003 | Fujiwara et al. |
| 2003/0154236 | A1 | 8/2003 | Dar et al. |
| 2003/0177178 | A1 | 9/2003 | Jones et al. |
| 2003/0182313 | A1 | 9/2003 | Federwisch et al. |
| 2003/0195903 | A1 | 10/2003 | Manley et al. |
| 2003/0204613 | A1 | 10/2003 | Hudson et al. |
| 2003/0204670 | A1 | 10/2003 | Holt et al. |
| 2003/0220985 | A1 | 11/2003 | Kawamoto et al. |
| 2004/0010714 | A1 | 1/2004 | Stewart |
| 2004/0024963 | A1 | 2/2004 | Talagala et al. |
| 2004/0054748 | A1 | 3/2004 | Ackaouy et al. |
| 2004/0078465 | A1 | 4/2004 | Coates et al. |
| 2004/0088297 | A1 | 5/2004 | Coates et al. |
| 2004/0103104 | A1 | 5/2004 | Hara et al. |
| 2004/0117438 | A1 | 6/2004 | Considine et al. |
| 2004/0133606 | A1 | 7/2004 | Miloushev et al. |
| 2004/0133652 | A1 | 7/2004 | Miloushev et al. |
| 2004/0139167 | A1 | 7/2004 | Edsall et al. |
| 2004/0153481 | A1 | 8/2004 | Talluri |
| 2004/0267752 | A1 | 12/2004 | Wong et al. |
| 2004/0267831 | A1 | 12/2004 | Wong et al. |
| 2005/0033932 | A1 | 2/2005 | Pudipeddi et al. |
| 2005/0055402 | A1 | 3/2005 | Sato |
| 2005/0125503 | A1 | 6/2005 | Iyengar |
| 2005/0188211 | A1 | 8/2005 | Scott et al. |
| 2005/0198062 | A1 | 9/2005 | Shapiro |
| 2005/0262102 | A1 | 11/2005 | Anderson et al. |
| 2006/0080371 | A1 | 4/2006 | Wong et al. |
| 2006/0161746 | A1 | 7/2006 | Wong et al. |
| 2006/0271598 | A1 | 11/2006 | Wong et al. |
| 2007/0024919 | A1 | 2/2007 | Wong et al. |
| 2007/0136308 | A1 | 6/2007 | Tsirigotis et al. |
| 2008/0114854 | A1 | 5/2008 | Wong et al. |

FOREIGN PATENT DOCUMENTS

| | | |
|---|---|---|
| EP | 1 209 556 | 5/2002 |
| WO | 2004/097686 | 4/2004 |
| WO | 2004/097571 | 11/2004 |
| WO | 2004/097572 | 11/2004 |
| WO | 2004/097624 | 11/2004 |
| WO | 2005/029251 | 3/2005 |
| WO | 2006/039689 | 4/2006 |
| WO | 2007/041456 | 10/2006 |
| WO | 2007/002855 | 1/2007 |

OTHER PUBLICATIONS

Bright, J.D. et al., "A Scalable Architecture For Clustered Network Attached Storage," Twentieth IEEE/Eleventh NASA Goddard Conference On Mass Storage Systems & Technologies, Apr. 7-10, 2003, 12 pages, Paradise Point Resort, San Diego, CA, USA.

Goldick. J., "Retry Of Extending Networking Design Notes," PSC, Carnegie-Mellon University, Feb. 1995, 42 pages.

"Leveraging The Benefits Of The EMC CLARiiON IP4700 Network File Sewer With The Oracle8i Database," an Engineering White Paper, Mar. 5, 2002, EMC Corporation.

Notification of Transmittal of the International Search Report and the Written Opinion, PCT/US04/12841, Oct. 13, 2004, 9 pages.

"Notification Of Transmittal Of The International Search Report And The Written Opinion Of The International Searching Authority, Or The Declaration," for PCT/US04/12844. Mar. 14, 2005, 14 pages.

Notification of Transmittal of the International Search Report and Written Opinion, PCT/US04/12846, Sep. 28, 2004, 8 pages.

Notification of Transmittal of the International Search Report and Written Opinion, PCT/US04/12847, Nov. 3, 2004, 7 pages.

Notification of Transmittal of the International Search Report and the Written Opinion, PCT/US04/30180, Mar. 27, 2006, 8 pages.

Office Action, U.S. Appl. No. 10/832,785, mailed Jan. 3, 2007.

Final Office Action, U.S. Appl. No. 10/832,785, mailed Aug. 31, 2007.

Office Action, U.S. Appl. No. 10/831,701, mailed Dec. 18, 2006.

PCT Int'l Search Report US/06/25430, May 8, 2007.

PCT Written Opinion US/06/25430, May 8, 2007.

Final Office Action, U.S. Appl. No. 10/831,701, mailed Sept. 12, 2007.

Office Action, U.S. Appl. No. 10/831,376, mailed Mar. 23, 2007.

Final Office Action, U.S. Appl. No. 10/831,376, mailed Aug. 10, 2007.

Office Action, U.S. Appl. No. 11/241,554, mailed Aug. 8, 2007.

Notice of Allowance, U.S. Appl. No. 10/831,376, dated Oct. 22, 2007.

Allowed Claims, U.S. Appl. No. 10/831,376, dated Oct. 22, 2007.

Office Action, U.S. Appl. No. 10/832,785, mailed May 28, 2008.

Office Action, U.S. Appl. No. 10/831,701, mailed Jun. 25, 2008.

Final Office Action, U.S. Appl. No. 11/241,554, mailed Jul. 25, 2008.

International Search Report sent Sep. 30, 2008 for PCT Application No. PCT/US05/35624.

Written Opinion sent Sep. 30, 2008 for PCT Application No. PCT/US05/35624.

U.S. Appl. No. 60/478,154, filed Apr. 24, 2003.

U.S. Appl. No. 60/465,578, filed Apr. 24, 2003.

U.S. Appl. No. 60/465,579, filed Apr. 24, 2003.

U.S. Appl. No. 60/615,002, filed Sep. 30, 2004.

Office Action mailed Feb. 3, 2005 for U.S. Appl. No. 10/832,927.

Office Action mailed Jun. 22, 2005 for U.S. Appl. No. 10/832,927.

Notice of Allowance mailed Feb. 9, 2006 for U.S. Appl. No. 10/832,927.

Allowed Claims, U.S. Appl. No. 10/832,927, dated Feb. 9, 2006.
U.S. Appl. No. 60/465,580, filed Apr. 24, 2003.
U.S. Appl. No. 60/503,190, filed Sep. 15, 2003.
Final Office Action, U.S. Appl. No. 10/832,785, mailed Jan. 5, 2009.
Final Office Action, U.S. Appl. No. 10/831,701, mailed Jan. 5, 2009.
Notice of Allowance, U.S. Appl. No. 10/831,701, mailed May 14, 2009.
Allowed Claims, U.S. Appl. No. 10/831,701.
Non-Final Office Action, U.S. Appl. No. 11/241,554, mailed Jan. 8, 2009.
Final Office Action, U.S. Appl. No. 11/241,554, mailed Aug. 19, 2009.
Examiner Interview, U.S. Appl. No. 11/241,554, mailed Sep. 30, 2009.
Non-Final Office Action, U.S. Appl. No. 11/395,118, mailed Jun. 10, 2009.
Non-Final Office Action, U.S. Appl. No. 11/537,997, mailed Sep. 25, 2009.
Non-Final Office Action, U.S. Appl. No. 10/942,762, mailed Jan. 8, 2009.
Final Office Action, U.S. Appl. No. 10/942,762, mailed Jul. 21, 2009.
International Preliminary Report on Patentability dated Apr. 10, 2008 for PCT Application No. PCT/US2006/038361.
European Search Report dated Dec. 14, 2008 for EP Patent Application No. 04750678.7.
European Office Action dated Apr. 9, 2009 for EP Patent Application No. 04750678.7.
Yamakawa et al., "NAS Switch: Virtualized Integration Techniques of NFS Server" Engineering Research Report of Institute of Electronics, Information and Communication Engineers, published by Institute of Electronics, Information and Communication Engineers, Japan, Aug. 22, 2002, vol. 102, No. 275, pp. 13-18.
Notice of Allowance with Examiner Interview and Amendment dated Dec. 29, 2009 for U.S. Appl. No. 10/832,785.
Non-Final Office Action dated Jan. 15, 2010 for U.S. Appl. No. 10/942,762.
Chinese Office Action dated Nov. 20, 2009 for CN Patent Application No. 200680032142.X.
Japanese Office Action dated Dec. 22, 2009 for JP Patent Application No. 200 513342.
Non-Final Office Action dated Feb. 5, 2010 for U.S. Appl. No. 11/241,554.
Final Office Action dated Feb. 18, 2010 for U.S. Appl. No. 11/395,118.

* cited by examiner

FILE SERVER MODULE
114

File Server Interface
210

Migration Module
220

Redirection Module
230

FIG. 2

DIRECTORY AND FILE MIRRORING FOR MIGRATION, SNAPSHOT, AND REPLICATION

CROSS-REFERENCE TO RELATED APPLICATIONS

This application claims the benefit of U.S. Provisional Application No. 60/641,217, filed on Dec. 31, 2004, entitled "Methods and Apparatus for Directory and File Mirroring with Applications in Migration, Replication and Snapshot"; and claims priority as a continuation-in-part to both U.S. patent application Ser. No. 10/831,701, filed on Apr. 23, 2004 now U.S. Pat. No. 7,587,422, entitled "Transparent File Replication Using Namespace Replication," by Thomas K. Wong et al., and to U.S. patent application Ser. No. 10/831,376, filed on Apr. 23, 2004 now U.S. Pat. No. 7,346,664, entitled "Transparent File Migration Using Namespace Replication," each of which applications are herein incorporated by reference in their entirety.

BACKGROUND OF THE INVENTION

1. Field of the Invention

This invention relates generally to storage networks and, more specifically, to a network device that uses mirroring when servicing file servers in a decentralized storage network.

2. Description of Related Art

In a computer network, NAS (Network Attached Storage) file servers connected directly to the network provide an inexpensive and easily configurable solution for a storage network. These NAS file servers are self-sufficient because they contain file systems that allow interoperability with clients running any operating system and communication using open protocols. For example, a Unix-based client can use the NFS (Network File System) protocol by Sun Microsystems, Inc. of Santa Clara, Calif. and a Windows-based client can use CIFS (Common Internet File System) by Microsoft Corp. of Redmond, Wash. to access files on a NAS file server. However, the operating system does not affect communication between the client and file server. Thus, NAS file servers provide true universal file access.

By contrast, more expensive and powerful SAN (Storage Area Network) file servers use resources connected by Fibre Channel on a back-end, or a dedicated network. A SAN file system is part of the operating system or an application running on the client. But heterogeneous client operating systems may require additional copies of each file to be stored on the storage network to ensure compatibility on the SAN file server. Additionally, communication between file servers on a SAN use proprietary protocols and thus are typically provided by a common vendor. As a result, NAS file servers are preferred when price and ease of use are major considerations. However, the benefits of NAS storage networks over SAN storage networks also have drawbacks.

One drawback with NAS file servers is that there is no centralized control. Accordingly, each client must maintain communication channels between each of the NFS file servers separately. When NAS file servers are either added or removed from the storage network, each client must mount or unmount directories for the associated storage resources as appropriate. This is particularly inefficient when there are changes in hardware, but not in the particular files available on the network, such as when a failing NAS file server is swapped out for an identically configured back-up NAS file server.

A related drawback is that a client must be reconfigured each time a file is relocated within the storage network, such as during file migration or file replication. The client generates a NAS file handle that identifies a physical location of the directory or file object on the file server. To access the object, the client sends an object access request directly to the NAS file server. When the file is relocated to a different NAS file server, subsequent requests for access to the file require a new look-up to locate the file and generate a new NAS file handle.

An additional drawback is that NAS file servers are inaccessible during large data transfer operations such as file migrations and replications. Such data transfers typically occur during non-business hours to reduce consequential downtime. However, ever-larger storage capacities increase the amount of time necessary for data transfers. Additionally, many enterprises and applications have a need for data that is always available.

Therefore, what is needed is a network device to provide transparency to clients of file servers such as NAS file servers. Furthermore, there is a need for the network device to allow file migration and replications to occur without the need for client reconfiguration. Moreover, there is a need for the network device to provide data integrity during file migration and replications.

BRIEF SUMMARY OF THE INVENTION

The present invention meets these needs by providing mirroring in a decentralized storage network that is transparent to a client. A NAS switch, in the data path of a client and NAS file servers, reliably coordinates file migration of a source file server to a destination file server using namespace replication to track new file locations, file replications, snapshot services, and the like. Additionally, the NAS switch maintains data availability during time-consuming data transfers.

An embodiment of a system configured according to the present invention comprises the NAS switch in communication with the client on a front-end of the storage network, and both a source file server and a destination file server on a back-end. The NAS switch associates NAS file handles (e.g., CIFS file handles or NFS file handles) received from the source and destination file servers with switch file handles that are independent of a location. The NAS switch then exports switch file handles to the client. In response to subsequent object access requests from the client, the NAS switch substitutes switch file handles with appropriate NAS file handles for submission to the appropriate NAS file server.

In another embodiment, the NAS switch further comprises a migration module to coordinate the migration of source files at locations on the source file server to destination files at locations on the destination file server. The migration module separately performs namespace replication and data replication. Namespace replication copies the namespace of the directory hierarchy on the source file server to the destination file server. Namespace replication can also include the use of stored file handles as pointers from the source file server to files migrated to the destination file server, or as pointers from the destination file server to files yet to be migrated from the source file server. In one embodiment, the migration module mirrors the namespace during migration to preserve data integrity. Next, the migration module migrates the data and swaps stored file handles.

In yet another embodiment, the migration module updates a file migration table upon successful migration of an object. Accordingly, the migration module enters the location of the object on the source file server and the location of the object on the destination file server. When an object access request is received, the NAS switch searches the file migration table according to the switch file handle. If a there is a match, the NAS switch sends the object access request to the location on the destination file server. Otherwise, the NAS switch sends the object access request to the location on the source file server. Advantageously, the migration module provides migration services to decentralized file servers and file servers that do not otherwise natively support migration.

In still another embodiment, during migration, the migration module duplicates requests (e.g., modification requests) to both the namespace on the source file server and the replicated namespace on the destination file server. In another embodiment, during replication, a replication module duplicates requests after the copying in order to maintain namespace mirroring.

BRIEF DESCRIPTION OF THE DRAWINGS

FIG. 2 is a block diagram illustrating a NAS switch according to one embodiment of the present invention.

DETAILED DESCRIPTION OF THE INVENTION

The present invention provides mirroring in a storage network that is transparent to the clients. A NAS (Network Attached Storage) switch in the data path of a client and NAS file servers on the storage network, uses namespace replication to coordinate, e.g., file migration and file replication between decentralized servers, and snapshots, while maintaining data availability to a client. Mirroring can ensure file integrity during namespace replication and data replication. Some embodiments of a system are described with respect to FIGS. 1-2, and some embodiments of a method operating therein are described with respect to FIGS. 3-10.

The accompanying description is for the purpose of providing a thorough explanation with numerous specific details. Of course, the field of storage networking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. For example, although the present invention is described with reference to storage networks operating under the NAS protocol, it can similarly be embodied in future protocols for decentralized storage networks other than NAS, or in mixed protocol networks. Accordingly, the present invention should not be understood as being limited to the specific implementations described below, but only by the claims that follow.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripts.

Figure 1:
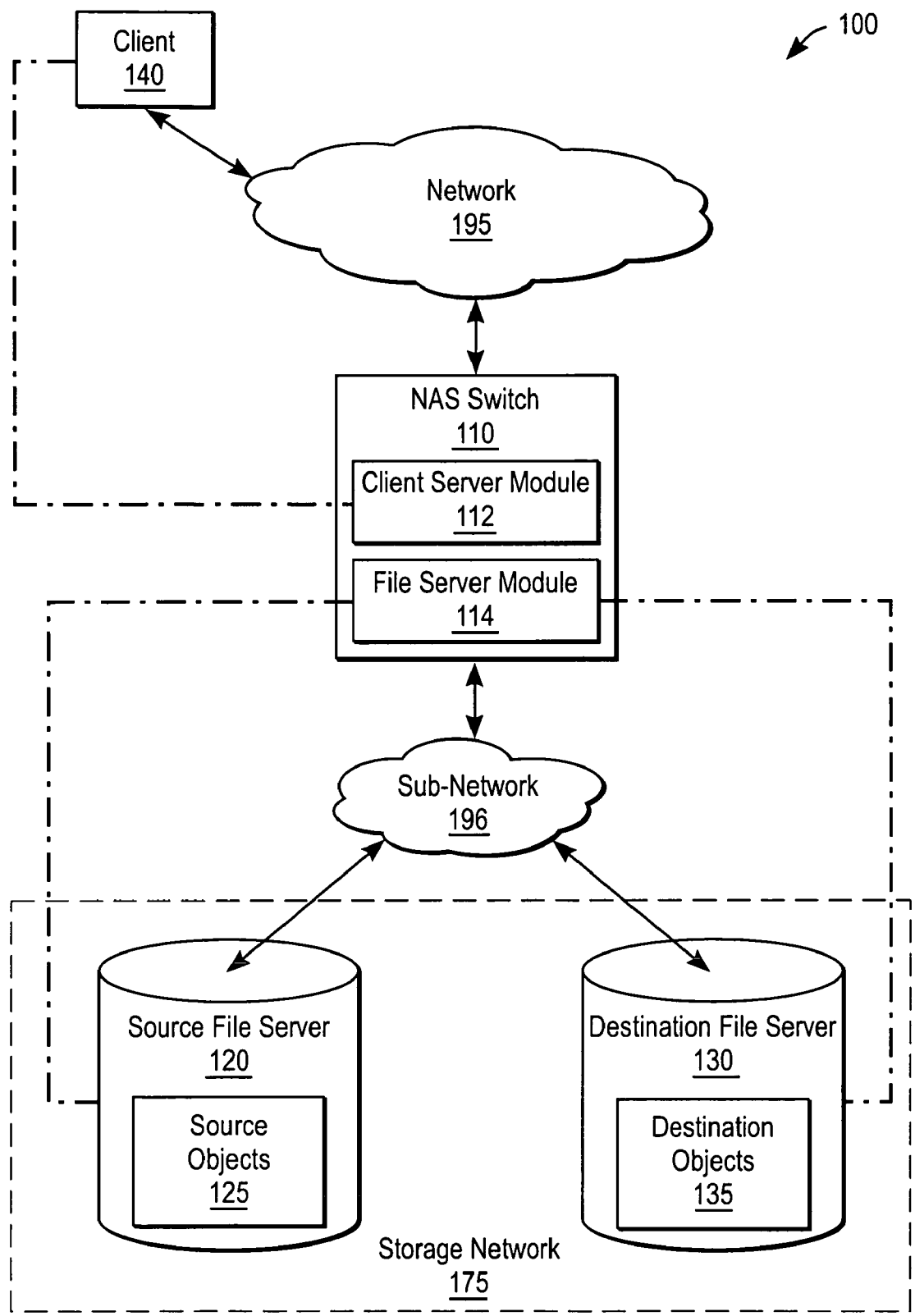
FIG. 1 is a high-level block diagram illustrating a storage network system according to one embodiment of the present invention.

FIG. 1 is a high-level block diagram illustrating a storage network system 100 according to one embodiment of the present invention. The system 100 comprises a NAS switch 110 and a client 140 coupled to a network 195. The NAS switch 110, a source file server 120, and a destination file server 130, are each coupled in communication through a sub-network 196. Note that there can be various configurations of the system 100, such as embodiments including additional clients 140, additional source and/or destination file servers 120, 130, and additional NAS switches 110. The system 100 components are implemented in, for example, a personal computer with an x86-type processor executing an operating system and/or an application program, a workstation, a specialized NAS device with an optimized operating system and/or application program, a modified server blade, etc. In one embodiment, the storage network 175 comprises a NAS using protocols such as NFS and CIFS. In another embodiment, the storage network 175 comprises a combination of NAS, SAN, and other types of storage networks. In yet another embodiment the storage network 175 comprises a decentralized standard or proprietary storage system other than NAS.

The NAS switch 110 provides continuous transparency to the client 140 with respect to object management. Specifically, the NAS switch can off-load tasks related to physical configurations, object management, object migration, object replication, efficient storage and/or other services on the storage network 175. Preferably, the NAS switch 110 emulates file server processes to the client 140 and emulates client processes to the file servers 120, 130. Accordingly, the client 140 is unaware of the NAS switch 110 since the NAS switch 110 is able to redirect NAS requests intended for the source file server 120 to appropriate locations on the destination file server 130. Thus, the client 140 submits object requests, such as file writes and directory reads, directly to the NAS switch 110. Likewise, the file servers 120, 130 are unaware of the NAS switch 110 since the NAS switch 110 is able to resubmit requests, contained in server file handles, as if they originated from the client 140. To do so, the NAS switch 110 can use mapping, translating, bridging, packet forwarding, other network interface functionality, and other control processes to perform file handle switching, thereby relieving the client 140 of the need to track changes in a file's physical location.

In one embodiment, the NAS switch 110 comprises a client module 112 and a file server module 114 to facilitate communications and file handle switching. The client module 112 receives exported file system directories from the file servers 120, 130 containing NAS switch handles. To create compatibility between the client 140 and the NAS switch 110, the client module 112 maps the file system directories to internal switch file systems which it sends to the client 140. To request an object, the client 140 traverses an exported switch file system and selects a switch file handle which it sends to the NAS switch 110 along with a requested operation.

The file server module 114 coordinates migration processes. The file server module 114 initiates tasks that are passively performed by the source and destination file server 120, 130, which may not have native migration capabilities. The file server module 114 replicates a namespace containing the data to be migrated from the source file server 120 to the destination file server 130, and then replicates associated data. During and afterwards, the file server module 114 redirects namespace and file object accesses request by the client 140 to appropriate locations. Thus, data transfer services remain available to the client 140.

In one embodiment, the file server module 114 also tracks reconfigurations resulting from migration, replication and other object relocation processes (e.g. adding or removing file server capacity) with a nested system of tables, or information otherwise linked to the switch file systems. The switch file handles are static as they are persistent through the relocation processes, but the associated NAS file handles can be dynamic as they are selected depending upon an object's current location. To track various copies of an object, the file server module 114 maintains a file handle migration table and a file handle replication table corresponding to each file system that maps NAS file handles of migrated and replicated objects to locations on the storage network 175. Further embodiments of the file server module 114 are described with respect to FIG. 2.

The client module 112 associates 310 a NAS file handle with a switch file handle as described below with respect to FIG. 4. This enables the NAS switch 110 to act as an intermediary between the client 140 and the file servers 120, 130. The client 140 submits NAS requests using switch file handles as if the NAS switch 110 were a file server 120, 130, and, in turn, the file servers 120, 130 process NAS file handles from the NAS switch 110 as if they were submitted by the client 140.

In general, NAS file handles uniquely identify objects, such as a directory file server, on the file servers 120, 130, such as a directory or file, as long as that object exists. NAS file handles are file server specific, and are valid only to the file servers 120, 130 that issued the file handles. The process of obtaining a file handle from a file name is called a look-up. The NAS file handle may be formatted according to protocols such as NFS or CIFS as discussed in further detail below, e.g., with reference to Tables 1A and 1B. By contrast, a switch file handle identifies a directory or file object independent of location, making it persistent through file replications, migrations, and other data transfers. The switch file handle can be a modified NAS file handle that refers to an internal system within the NAS switch 110 rather than the source file server 120. This enables the NAS switch 110 in mapping persistent file handles to a choice of alternative NAS file handles. An original NAS file handle refers to an initial object location on the source file server 120. A stored NAS file handle refers to a NAS file handle, stored as an object on the file servers 120, 130, which points to an alternative file location.

Object access requests handled by the NAS switch 110 include, for example, directory and/or file reads, writes, creation, deletion, moving, and copying. A namespace access refers to an operation accessing or modifying the namespace such as look-up, rename, delete, or create. A file access refers to an operation accessing or modifying files such as read or write. An object can refer to a directory object or a file object. Directory objects can further comprise sub-directories and file objects within directory. As used herein, various terms are used synonymously to refer to a location of an object prior to migration (e.g., "primary"; "source"; "original"; and "first") and various terms are used to refer to a location of the same object after migration (e.g., "replica"; "destination"; "substitute"; and "second"). Further embodiments of the NAS switch 110 and methods operating therein are described below.

The client 140 accesses resources on the file servers 120, 130 by submitting a switch file handle to the NAS switch 110, intended for the source file server 120. To find the switch handle, the client 140 first mounts an exported switch file system containing switch file handles. The client 140 looks-up an object to obtain its file handle and submits an associated request. From the perspective of the client 140, transactions are carried out by the file servers 120, 130 having object locations that do not change. Thus, the client 140 interacts with the NAS switch 110 before and after a file replication in the same manner. A user of the client 140 can submit operations through a command line interface, a windows environment, a software application, or otherwise. In one embodiment, the NAS switch 110 further provides access to a storage network 175 other than a NAS storage network.

The source file server 120 is the default or original network file server for the client 140 before file migration. The source file server 120 further comprises source objects 125, which include namespace directories and files such as enterprise data, records, database information, applications, and the like. The source file server 120 can store a table of migrated directories maintained by the NAS switch 110 that correlate results from namespace migration. Moreover, the source file server 120 can store a file handle migration table, maintained by the NAS switch 110, denoting each migrated directory and file object. The source file server 120 comprises, for example, a personal computer using an x86-type processor with an operating system and/or an application, a workstation, a specialized NAS device with an optimized operating system and/or application, a modified server blade, etc.

The destination file server 130 becomes the primary network file server used by the NAS switch 110 after file migration. The destination file server 130 further comprises destination objects 135, which include the replicated namespace directories and source files. The destination file server 130 can comprise the same hardware and/or software as described with reference to the source file server 120. The source and destination file servers 120, 130 are preferably NAS file server, but can also be file servers using other decentralized protocols that do not inherently support file migration. Further embodiments of the source and destination file servers 120, 130 and related methods are described below.

The network 195 facilitates data transfers between connected hosts (e.g., 110, 140). The connections to the network 195 may be wired and/or wireless, packet and/or circuit switched, and use network protocols such as TCP/IP (Transmission Control Protocol/Internet Protocol), IEEE (Institute of Electrical and Electronics Engineers) 802.11, IEEE 802.3 (i.e., Ethernet), ATM (Asynchronous Transfer Mode), or the like. The network, 195 comprises, for example, a LAN (Local Area Network), WAN (Wide Area Network), the Internet, and the like. In one embodiment, the NAS switch 110 acts as a gateway between the client 140, connected to the Internet, and the directory file server 120, and the shadow file servers 130, connected to a LAN. The sub-network 196 is preferably a local area network providing optimal response time to the NAS switch 110. In one embodiment, the sub-network 196 is integrated into the network 195.

FIG. 2 is a block diagram illustrating the file server module 112 according to one embodiment of the present invention. The file server module 114 comprises a file server interface 210, a migration module 220, and a redirection module 230. Generally, the file server interface 210 manages operations before migration, the migration module 220 maintains data availability during migration, and the redirection module 230 provides transparency to the client 140 after migration. Note that modules are merely exemplary groupings of functionality.

Prior to file migration, the file server interface 210 receives a switch file handle with a request from the client 140 which it uses to find an original NAS file handle. The file server interface 210 submits the original NAS file handle with the request to the source file server 120. If the object has yet to change locations in the storage network 175, the file server interface 210 uses the original NAS file handle. The file server interface 210 can submit the switch file handle to the migration module 220 to determine if the object is part of a data migration. Also, the file server interface 220 can submit the switch file handle to the redirection module 230 to determine if the object has completed data migration. In either case, an appropriate NAS file handle is returned for the file server interface 210 to use in forwarding the client request to the appropriate file server 120, 130

During file migration, a migration module 220 in the NAS switch 110 coordinates migration from the source file server 120 to the destination file server 130 using namespace replication. Namespace replication copies directory metadata of the source file server 120 separately from the data itself. Because the namespace replication is many times faster than the data migration, directory services remain available even while the data migration occurs. The migration module 220, in one embodiment, mirrors the original and replicated namespace to maintain integrity during migration. The migration module 220 can use a file handle migration table (or a file location table) to track mirrored objects by changing a state to "mirrored." Once the migration of namespace and data has completed, the migration module 220 updates the file handle migration table by changing the state "mirrored" to "migrated."

After file migration, the redirection module 230 looks-up switch file handles received from the client 140 in the file handle migration table. IF an object has been migrated, the redirection module outputs a destination NAS file handle corresponding to a location on the destination file server 130.

Figure 3:
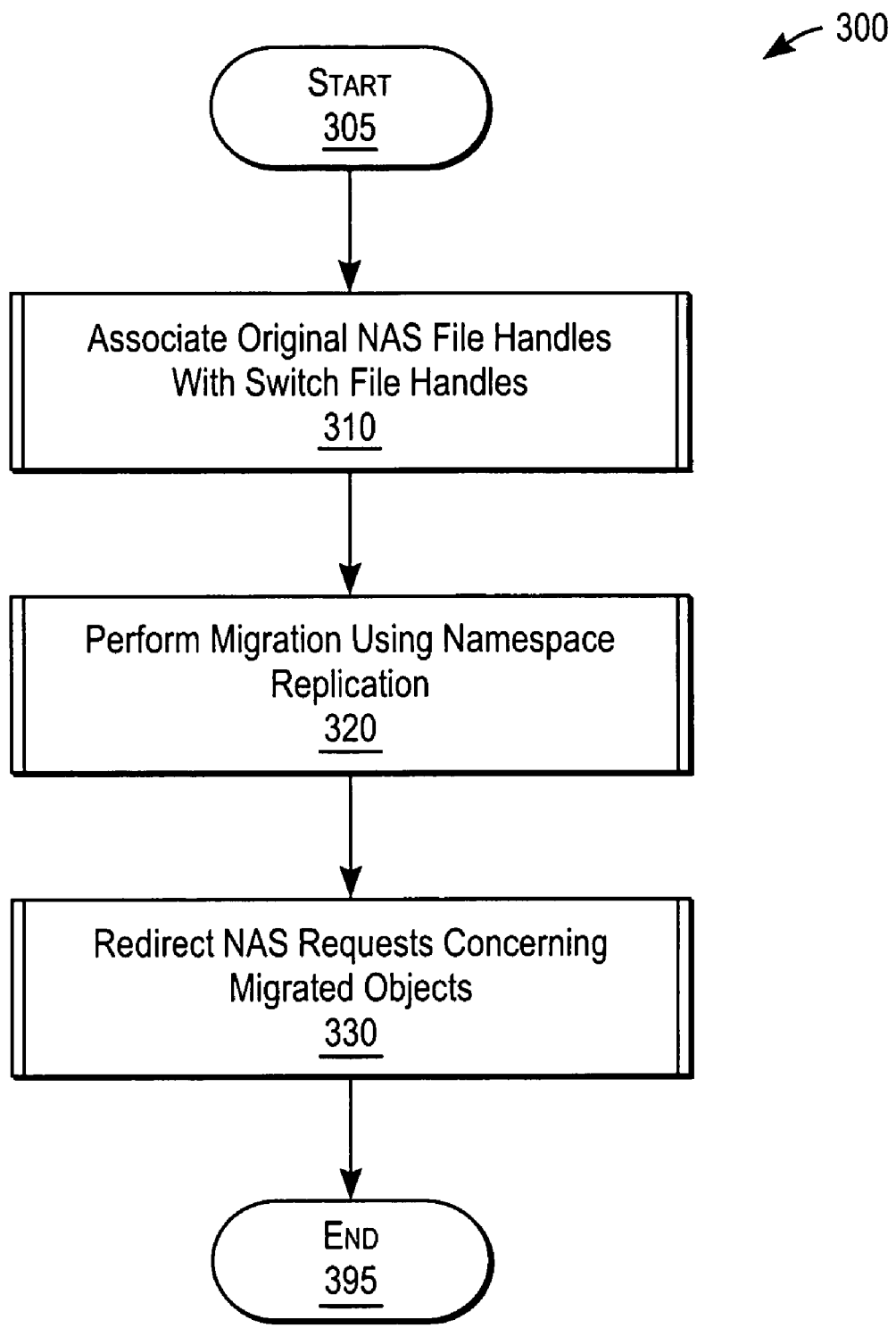
FIG. 3 is a high-level flow chart illustrating a method of providing transparent file migration in a NAS storage network according to one embodiment of the present invention.

FIG. 3 is a high-level flow chart illustrating a method 300 of providing transparent file migration in a NAS storage network according to one embodiment of the present invention. The client module 112 associates 310 an original NAS file handle with a switch file handle as described below with respect to FIG. 4. This enables the NAS switch 110 to act as an intermediary between the client 140 and the file servers 120, 130. The client 140 submits NAS requests using switch file handles as if the NAS switch 110 were a file server 120, 130, and, in turn, the file servers 120, 130 process NAS file handles from the NAS switch 110 as if they were submitted by the client 140.

The migration module 220 performs 320 file migration using namespace replication as described below with respect to FIGS. 5-9. By separating directory replication from data replication, the migration module 220 is able to maintain availability and data integrity between the file servers 120, 130.

The redirection module 230 redirects 330 NAS requests concerning migrated files as described below with respect to FIG. 10. Because the NAS switch 110 coordinates and stores elements involved in migration, the client 140 continues referring to objects stored in alternative locations with the same switch file handle used prior to replication. On the back end, however, many changes can occur. For example, file migration relocates the source objects 125 from the source file server 120 to the destination file server 120.

Figure 4:
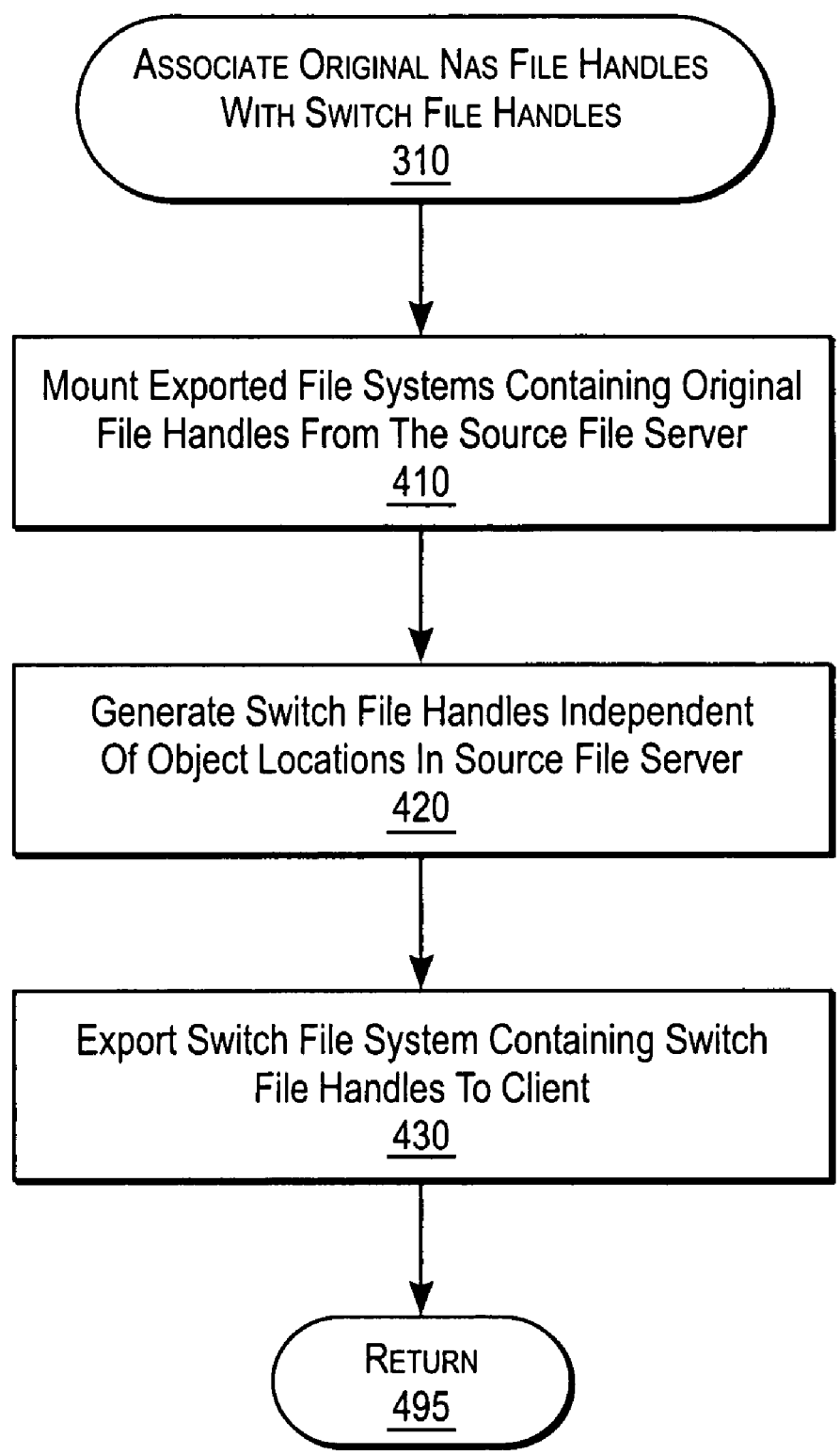
FIG. 4 is a flow chart illustration a method of associating original NAS file handles with switch file handles according to one embodiment of the present invention.

FIG. 4 is a flow chart illustration the method 310 of associating a NAS file handle with a switch file handle according to one embodiment of the present invention. Initially, the NAS switch 110 mounts 410 an exported directory of file systems from the primary server 120. in general, the file system organizes objects on the file servers 120, 130 into a directory hierarchy of NAS file handles. In one embodiment, the NAS switch 110 receives exported directories from associated source file servers 120 and, in turn, sends exported directories to associated clients 140.

The client module 112 generates 420 switch file handles independent of object locations in the primary file server 120. The client module 112 organizes exported file systems from the file server 120 by replacing file system or tree identifiers with a switch file system number as shown below in Tables 2A and 2B. The client module 112 exports 430 the switch file system to the client 140 to use in requesting operations. In the reverse process, the NAS switch 110 receives the NAS request and searches replicated file handles and/or replicated namespaces using the NAS file handle. Accordingly, the file server interface 210 checks entries of nested tables maintained by the synchronization module 230. The file server interface 210 generates a NAS file handle from the switch file handle based on an object location. An example of the contents of an NFS and CIFS file handle are shown in Tables 1A 1B, while an example of switch file handles or modified NFS and CIFS file handles are shown in Tables 2A and 2B:

TABLE 1A

NFS File Handle Contents

| Field Name | Description |
|---|---|
| fsid | File system identification - identifies an exported file system of a file server |
| file id | File identification - identifies a file or directory object of an exported file system |
| gen id | Generation identification - changes each time the file identification is re-used to identify a different file or directory object |

TABLE 1B

CIFS File Handle Contents

| Field Name | Description |
|---|---|
| tree id | Tree identification - assigned by a CIFS server |
| file id | File identification - unique within a tree identification |

TABLE 2A

Contents of NFS Switch File Handle

| Field Name | Description |
| --- | --- |
| file system id | File system identification - index to NAS switch 110 file system export table that identifies the name and location of a NAS files search |
| file id | File identification - identifies a file or directory object of an exported file system |
| gen id | Generation identification - changes each time the file identification is re-used to identify a different file or directory object |

TABLE 2B

Contents of CIFS Switch File Handle

| Field Name | Description |
| --- | --- |
| file system id | File system identification - index to NAS switch 110 file system export table that identifies the name and location of a NAS files search |
| file id | File identification - unique within a tree identification |

As discussed below, after objects have been migrated, the NAS switch 110 can accesses objects at new locations using updated NAS file handle.

Figure 5:
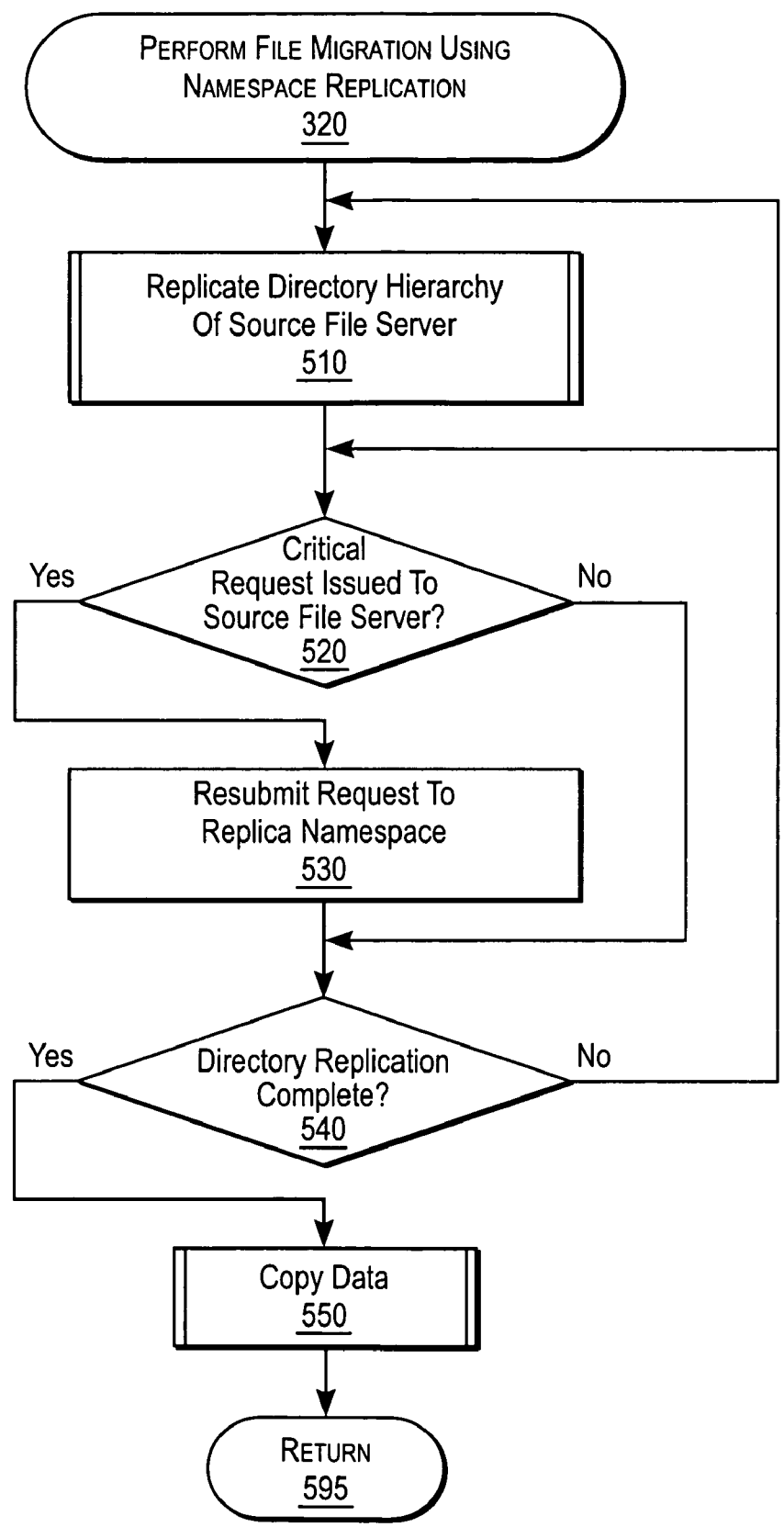
FIG. 5 is a flow chart illustrating a method of performing file migration using namespace replication according to one embodiment of the present invention.

FIG. 5 is a flow chart illustrating the method 220 of performing file migration using namespace replication according to one embodiment of the present invention. The migration module 220 replicates 510 a directory hierarchy of the source file server 120 as described below with respect to FIGS. 6-7. In one embodiment, the migration module mirrors the namespace and data by invoking a MkMirror function. The MkMirror command creates an object in the destination file server 130 corresponding to an object in the source file server 120. Next, the MkMirror command copies the contents and attributes of the object. The contents of a directory can include immediate children (e.g., subdirectories and files), and the contents of a file include data.

In one embodiment, if a critical directory request is issued to the source file server 520 during file migration 510, the migration module 220 resubmits 530 the request to update the replicated namespace. In other embodiments, the copied object can be deleted and then recopied so that the copied object reflects any modifications. Preferably, the replicated namespace is stored on the destination file server 130. As a result, when critical operations such as a create directory, create file, delete, directory, delete file, and the like affect the source namespace, that same modification is made to the replicated namespace.

In one embodiment, the migration module 220 serializes critical directory requests in order to maintain the mirror. If the source file server 120 executes a series of modifications in a different order, an object and its replicated object can arrive at different states, and the mirror will be invalid. Therefore, the migration module 220 ensures that the requests are executed in the same order. For example, the NAS switch 110 can receive two requests at the same time, such as Request A to write the text "rainy" at the beginning of the file "report.txt", and Request B to write the text "sunny" at the beginning of the file "report.txt." Also, a single request can be broken up into two separate requests (e.g., a move request involves a delete request and a create request). The requests can be queued into separate queues corresponding to the source and destination servers 120, 130 which operate under a set of rules. More specifically, requests at the front of the queues (e.g., first in first out queues) can be issued. A request and its mirrored counterpart are removed from the front of the queues only when replies have been received by the NAS switch 110. One of the replies is forwarded to the client 140 and the other reply can be discarded after being examined. Then, the next request can be issued from the queues. In some cases, on server has successfully executed the request while the other may have failed (e.g., due to lack of disk space). Differences in the replies can signal that the mirror has an error. In response, the migration module 220 can break (or abort) the mirror to clean up the destination export.

Once the directory replication is complete 540, critical directory operations can be submitted directly to the replicated namespace. In a separate process, the migration module 220 copies 550 data from the source file server 120 to the destination file server 130. The objects involved in data copying can also be mirrored during migration.

As used during migration, mirroring provides duplicate sets of migrated namespace and data in case of failure. In another example, mirroring during and after replication provides full functionality from original and replicated data. In still another example, mirroring prior to migration or replication provides a snapshot of a file system at a particular instance.

Figure 6:
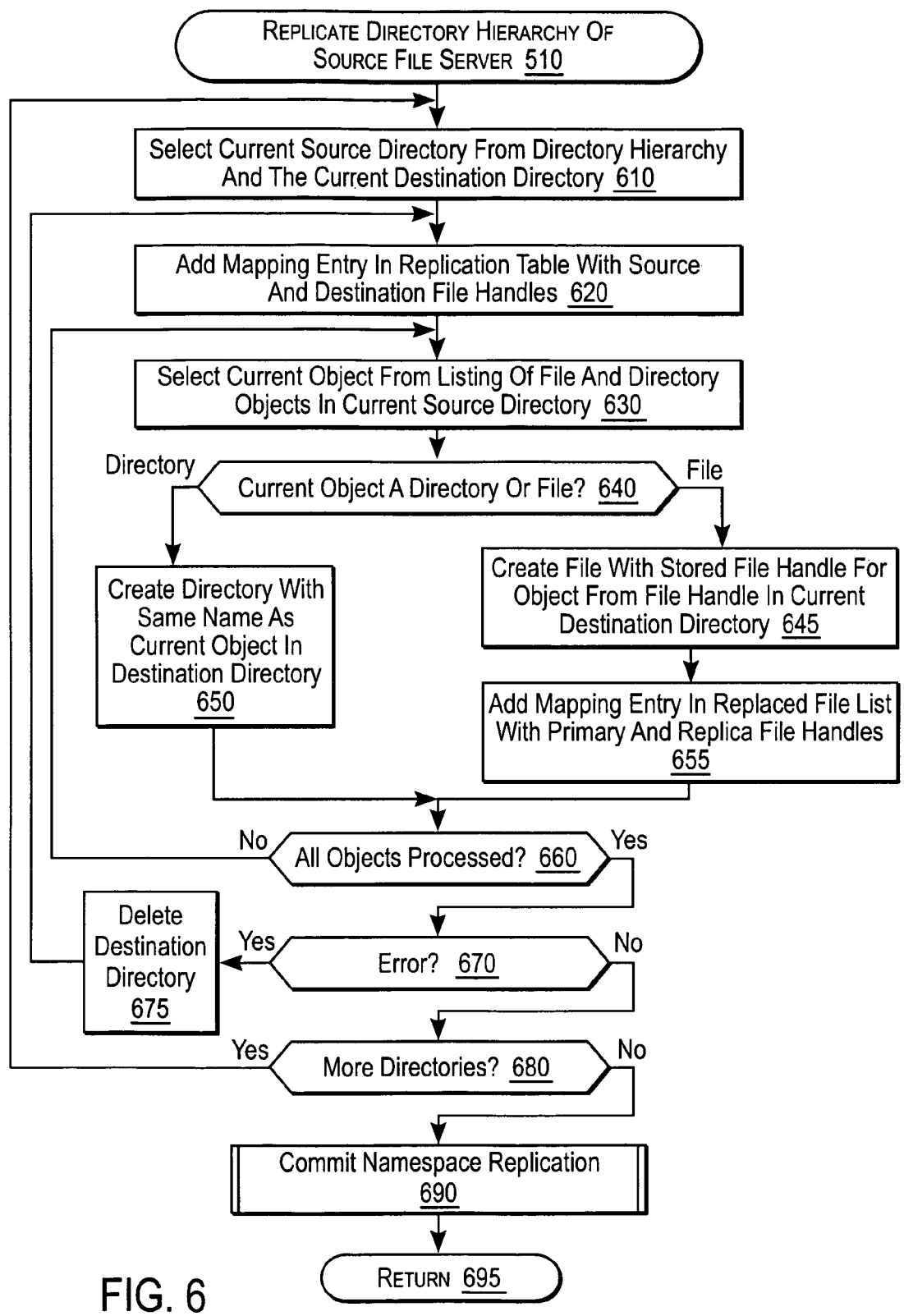
FIG. 6 is a flow chart illustrating a method of replicating a directory hierarchy of a source file server according to one embodiment of the present invention.

FIG. 6 is a flow chart illustrating the method 510 of replicating a directory hierarchy from the source file server 120 to the destination file server 130 according to one embodiment of the present invention. The reproduction module 220 selects 610 a current source directory from the directory hierarchy of the source file server 120 and the current destination directory from the destination file server 130. The migration module 220 adds 620 a mapping entry in a replication table during migration with switch file handles related to the source and destination locations. The migration module 220 selects 630 a current object from a listing of file and directory objects in the current source directory.

If the current object is a directory 640, the migration module 220 creates 650 a directory in the destination file server 130 with the same name as the current directory in the primary file server 120 (e.g., using the MkMirror function). On the other hand, if the current object is a file 640, the reproduction module 220 creates 645 a file with a stored file handle for the object from the file handle in the current destination directory. In one embodiment, the stored file handle is similar to the switch file handle. Preferably, the stored file handle is a predetermined size so that the NAS switch 110 can determine whether a file contains a stored file handle merely by inspecting the file's size. An exemplary stored file format is shown in Table 3:

TABLE 3

Exemplary Stored File Handle

| Byte Offset | Length | Name | Description |
| --- | --- | --- | --- |
| 0–3 | 4 | Stored file handle identifier | 0x06072022 |
| 4–7 | 4 | Stored file handle type | =1 for NFS, =2 for CIFS |
| 8–11 | 4 | Size of stored file handle | Hash value from switch file handle |
| 12–15 | 4 | Contents of stored file handle | Size in bytes |

TABLE 3-continued

Exemplary Stored File Handle

| Byte Offset | Length | Name | Description |
|---|---|---|---|
| 12-size of switch file handle | Size of switch file handle | Padding | See above description |
| | Enough bytes to pad to a length of 419 bytes for NFS and 431 bytes for CIFS | | =0x0 byte |

Note, however, that there can be variations of the stored file format. The migration module 220 adds 655 a mapping entry in a replicated file list with source and destination switch file handles.

If all objects have been processed 660, no errors were committed in the process 670, and there are no more directories to replicate 680, the reproduction module 220 commits 690 the namespace replication. However, if there are more objects to be processed 660, the migration module 220 continues the process from selecting 630 objects. If there was an error in the directory or file creation 670, the reproduction module 220 deletes 675 the destination directory, and repeats the process from adding 620 mapping entries. Also, if there are more directories to process 680, the first file server 120 returns to selecting 510 primary directories.

Figure 7:
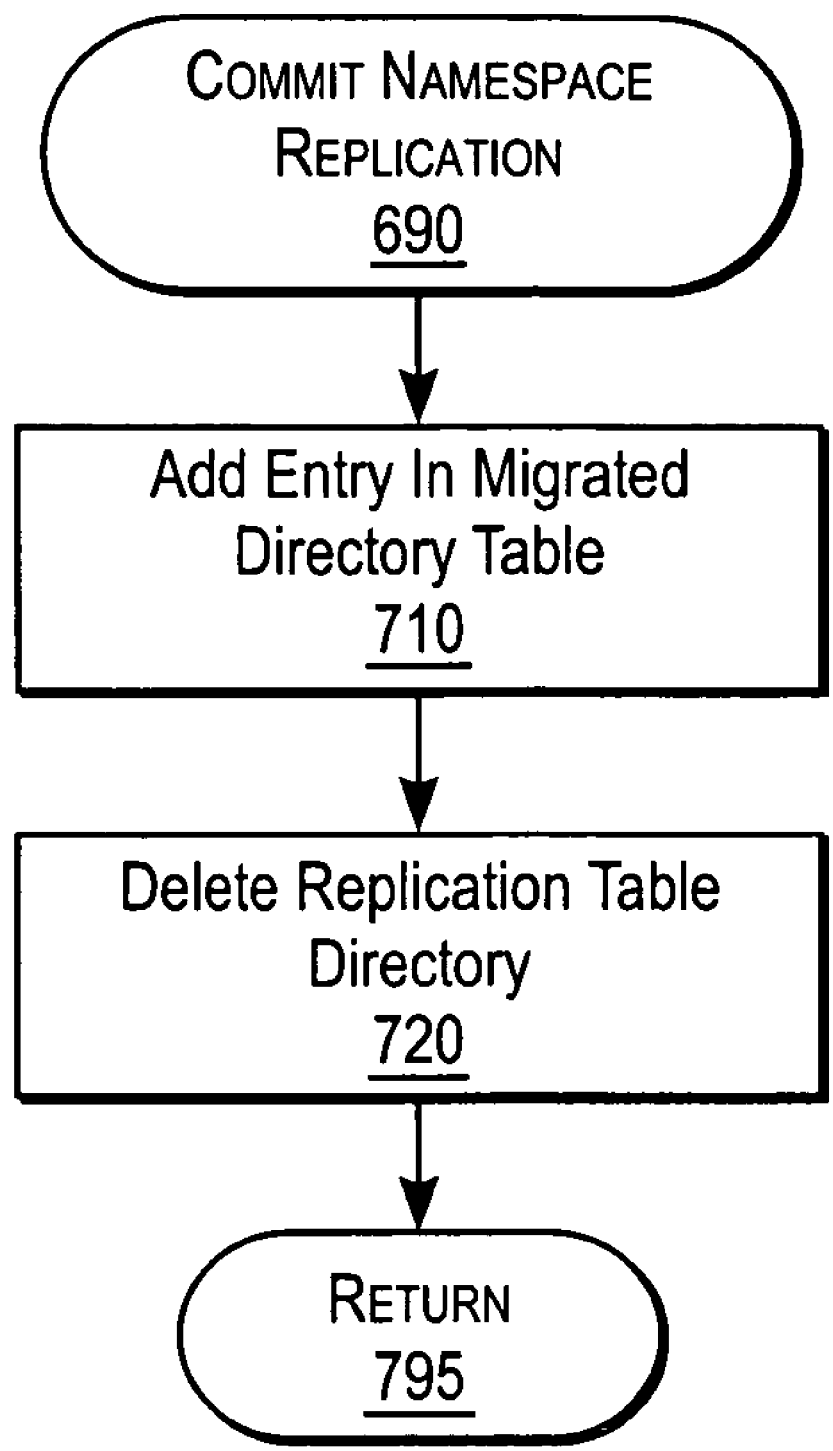
FIG. 7 is a flow chart illustrating a method of committing namespace replication according to one embodiment of the present invention.

The migration module 220 commits 690 the namespace as shown in FIG. 7. FIG. 7 is a flow chart illustrating the method 590 of committing the namespace replication according to one embodiment of the present invention. The migration module 220 adds 710 an entry to the file handle migration table. In one embodiment, the entry adds "mirrored" to a state of each of the objects as shown in Table 4. The source file server 120 deletes 720 the replication table since it is no longer needed.

TABLE 4

Exemplary File Handle Migration Table During Migration

| Origin Export | Origin Path | State | Destination Export | Destination Path |
|---|---|---|---|---|
| X:/export/home1 | /johndoe/work | Mirrored | X:/export/dst | /johndoe/mirror |
| X:/export/home1 | /johndoe/work/asia | Mirrored | X:/export/dst | /johndoe/mirror/asia |
| X:/export/home1 | /johndoe/work/us | Mirrored | X:/export/dst | /johndoe/mirror/us |
| X:/export/home1 | /johndoe/workus/boss | Mirrored | X:/export/dst | /johndoe/mirror/us/boss |

Figure 8:
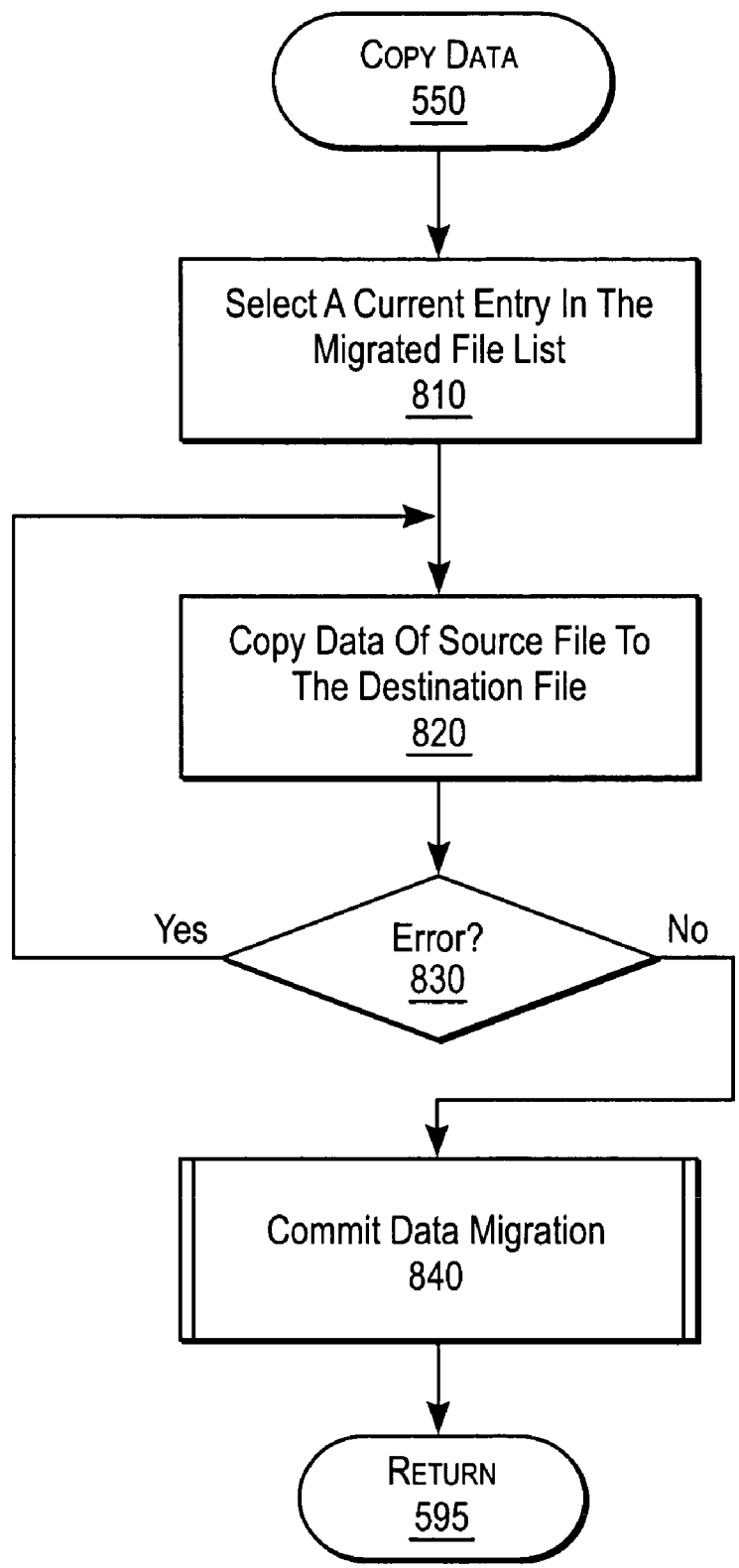
FIG. 8 is a flow chart illustrating a method of copying data according to one embodiment of the present invention.

FIG. 8 is a flow chart illustrating the method 420 of copying data according to one embodiment of the present invention. The NAS switch 110 selects 810 a current entry in the migrated file list. The source file server 120 copies 820 the data of the source objects 125 to the destination objects 135 in the destination file server 130.

Figure 9:
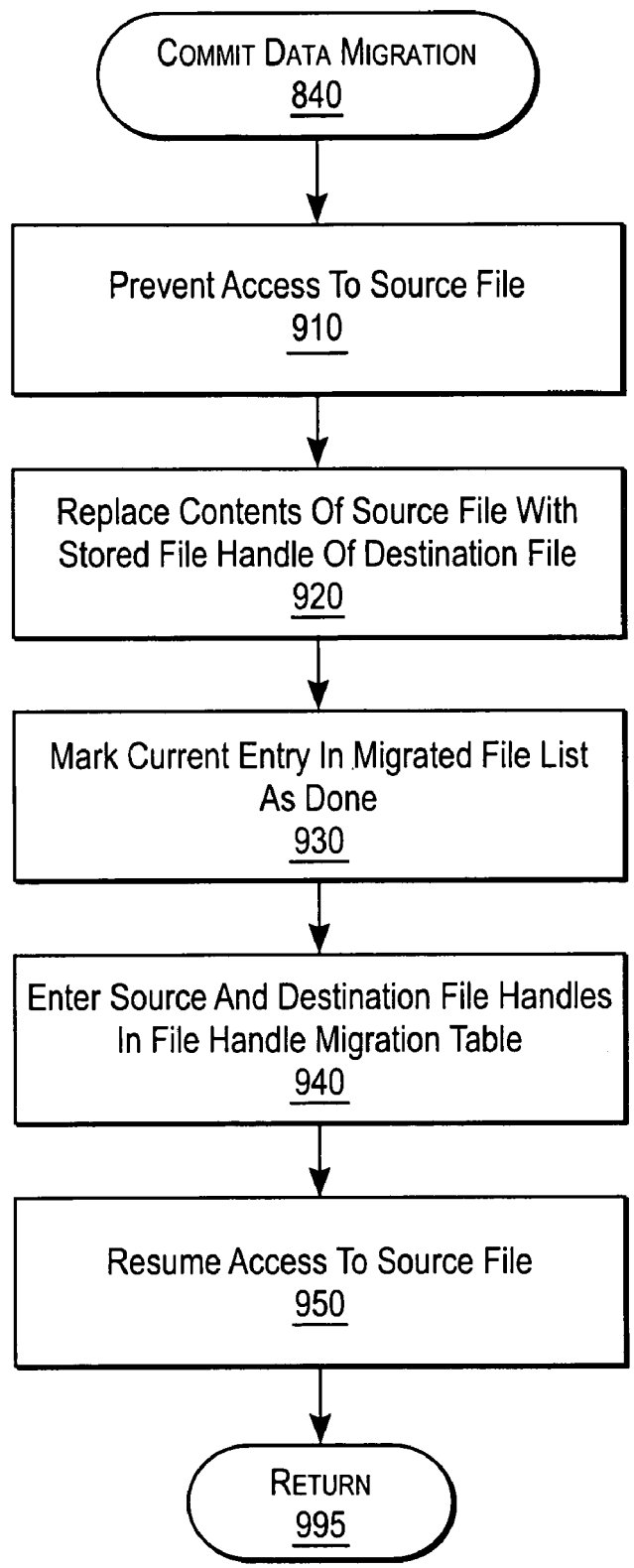
FIG. 9 is a flow chart illustrating a method of committing data migration according to one embodiment of the present invention.

If no error occurs during the data transfer 830, the destination file server 130 commits 840 the data migration as shown in FIG. 9. FIG. 9 is a flow chart illustrating the method 840 of committing data migration according to one embodiment of the present invention. The migration module 220 locks 910 the source file to prevent further access to the file. The migration module 220 replaces 920 the contents of the source file with a stored file handle indicating the new location on the destination file server 130. The migration module 220 marks 930 the current entry in the migrated file list as done, and enters 840 the source and destination file handles indicative of the locations on the source and destination file servers 120, 130 in the file handle migration table. The migration module 220 can also change the state of objects in the file handle migration table from "mirrored" to "migrated" as shown in Table 5. In some embodiments, the directory of objects on the source file server 120 is deleted to recapture storage capacity. Finally, the migration module 220 resumes 950 access to the source file.

TABLE 5

Exemplary File Handle Migration Table After Migration

| Origin Export | Origin Path | State | Destination Export | Destination Path |
|---|---|---|---|---|
| X:/export/home1 | /johndoe/work | Migrated | X:/export/dst | /johndoe/mirror |
| X:/export/home1 | /johndoe/work/asia | Migrated | X:/export/dst | /johndoe/mirror/asia |
| X:/export/home1 | /johndoe/work/us | Migrated | X:/export/dst | /johndoe/mirror/us |
| X:/export/home1 | /johndoe/workus/boss | Migrated | X:/export/dst | /johndoe/mirror/us/boss |

Note that in a file replication process, the file handle migration table can state be changed from "mirrored" to "replicated." In the replicated state, the NAS switch 110 still serializes and mirrors the modifying requests to both the source and replica file servers 120, 130. If both copies are equally up-to-date, then the NAS switch 110 can issue the request based on the lowest load. In a snapshot process, the "mirror" state can be dropped to preserve current snapshot in the source server 120 while requests are forwarded to the replica server 130.

In one embodiment, the migration module 220 reconstructs the migration module 220 due to, for example, a device crash or data corruption. To do so, the migration module 220 walks through the namespace of the source file server 120. Since the stored file handles have a consistent size, the migration module 220 can quickly recognize stored file handles and retrieve pointer information. This association is added to entries in a reconstructed file handle migration table.

Referring again to FIG. 8, if an error does occur 830, the data transfer is repeated. In one embodiment, the destination file server 110 detects an error by comparing the file size before migration to the file size after migration.

Figure 10:
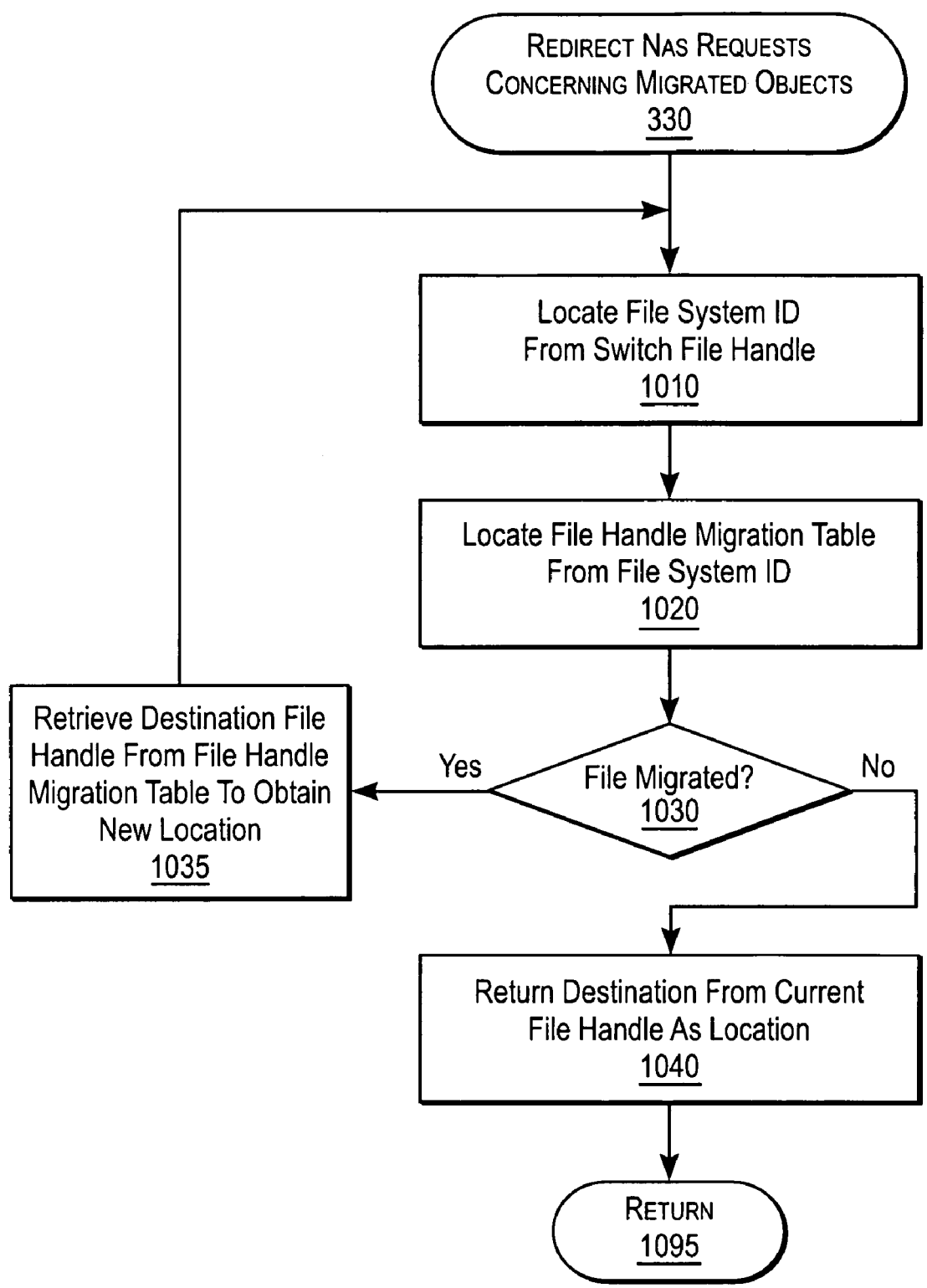
FIG. 10 is a flow chart illustrating a method of redirecting NAS requests concerning migrated objects according to one embodiment of the present invention.

FIG. 10 is a flow chart illustrating the method 330 of redirecting NAS requests concerning migrated objects according to one embodiment of the present invention. The NAS switch 110 locates 1010 a file system ID in the file systems table from the switch file handle. The NAS switch 110 next locates 1020 the file handle migration table from the file system ID. If the file has not migrated 1030, the NAS switch 110 forwards the client request using the source or original NAS file handle. If the file has migrated 1030, the NAS switch 110 retrieves the destination NAS file handle from the file handle migration table in the source file server 120.

We claim:

1. A method comprising:
   receiving NAS (Network Attached Storage) file handles at a storage network switch, the NAS file handles including locations of objects on a source file server;
   sending switch file handles to a client device, the switch file handles representative of the objects and independent of the locations of the objects;
   mirroring at the storage network switch a namespace including the locations of the objects on the source file server, wherein the namespace is stored on the source file server and is mirrored from the source file server to a mirrored namespace on a destination file server;
   replicating the objects from the source file server to the destination file server;
   receiving at the storage network switch a request to modify an object associated with the namespace from the client device; and
   sending at the storage network switch the request to modify the object associated with the namespace to both the source file server and the destination file server, wherein the source file server and the destination file server modify corresponding objects in the namespace and the mirrored namespace.

2. The method of claim 1, further comprising:
   responsive to an inconsistency between the namespace and the mirrored namespace, reverting to the namespace as an authoritative namespace.

3. The method of claim 1, further comprising:
   responsive to an inconsistency between the namespace and the mirrored namespace, repeating mirroring of the namespace.

4. The method of claim 1, wherein at least one object comprises a directory that includes another object representative of one or more of sub-directories or files.

5. The method of claim 1, wherein at least one object comprises a file.

6. The method of claim 1, further comprising:
   in a migration process, redirecting requests to the destination file server once replicating the objects has completed.

7. The method of claim 1, further comprising;
   in a replication process, redirecting requests to either the source file server or the destination file server depending on server loads.

8. The method of claim 1, wherein the migrating the object comprises updating a file handle migration table with an entry for the location on the source file server and an entry for the location on the destination file server responsive to a successful migration.

9. The method of claim 1, wherein the request comprises a namespace access request including one from the group consisting of a create request, a delete request, a move request, a copy request, a look-up request and a rename request.

10. The method of claim 1, wherein the NAS file handle comprises one from the group consisting of a NFS (Network File System) file handle and a CIFS (Common Internet File System) file handle.

11. A method for centrally accessing an object in a decentralized storage network, comprising:
   receiving input file handles at a storage network switch, the input file handles including locations of objects on a source file server;
   sending switch file handles to a client device, the switch file handles representative of the objects and independent of the locations of the objects;
   mirroring at the storage network switch a namespace including the locations of the objects on the source file server, wherein the namespace is stored on the source file server and is mirrored from the source file server to a mirrored namespace on a destination file server;
   replicating the objects from the source file server to the destination file server;
   receiving at the storage network switch a request to modify an object associated with the namespace from the client device; and
   sending at the storage network switch the request to modify the object associated with the namespace to both the source file server and the destination file server, wherein the source file server and the destination file server modify corresponding objects in the namespace and the mirrored namespace.

12. The method of claim 11, further comprising:
   responsive to an inconsistency between the namespace and the mirrored namespace, reverting to the namespace as an authoritative namespace.

13. The method of claim 11, further comprising:
   responsive to an inconsistency between the namespace and the mirrored namespace, repeating mirroring of the namespace.

14. A computer program product, comprising:
   a computer-readable medium having computer program instructions and data embodied thereon for a method accessing an object in a NAS (Network Attached Storage) storage network, the method comprising:
   receiving NAS (Network Attached Storage) file handles at a storage network switch, the NAS file handles including locations of objects on a source file server;
   sending switch file handles to a client device, the switch file handles representative of the objects and independent of the locations of the objects;
   mirroring at the storage network switch a namespace including the locations of the objects on the source file server, wherein the namespace is stored on the source file server and is mirrored from the source file server to a mirrored namespace on a destination file server;
   replicating the objects from the source file server to the destination file server;
   receiving at the storage network switch a request to modify an object associated with the namespace from the client device; and
   sending at the storage network switch the request to modify the object associated with the namespace to both the source file server and the destination file server, wherein the source file server and the destination file server modify corresponding objects in the namespace and the mirrored namespace.

15. The method of claim 14, further comprising:
   responsive to an inconsistency between the namespace and the mirrored namespace, reverting to the namespace as an authoritative namespace.

16. The method of claim 14, further comprising:
   responsive to an inconsistency between the namespace and the mirrored namespace, repeating mirroring of the namespace.

* * * * *